United States Patent
Labuschagne (10) Patent No.: US 7,591,107 B2
(45) Date of Patent: Sep. 22, 2009

(54) PORTABLE FACILITY AND PROCESS FOR RECONDITIONING ANTIFRICTION BEARINGS

(75) Inventor: Jan H. Labuschagne, Gauteng (ZA)

(73) Assignee: The Timken Company, Canton, OH (US)

( * ) Notice: Subject to any disclaimer, the term of this patent is extended or adjusted under 35 U.S.C. 154(b) by 935 days.

(21) Appl. No.: 09/819,194

(22) Filed: Mar. 28, 2001

(65) Prior Publication Data

US 2002/0148171 A1    Oct. 17, 2002

(51) Int. Cl.
B60P 3/025 (2006.01)
B60P 3/14 (2006.01)

(52) U.S. Cl. .................. 52/79.5; 52/12; 296/24.32; 29/402.04

(58) Field of Classification Search .............. 52/79.1, 52/79.5, 79.6, 79.12, 143; 296/24, 24.32; 29/402.01, 402.03, 402.04, 402.08, 402.11, 29/402.18

See application file for complete search history.

(56) References Cited

U.S. PATENT DOCUMENTS

| | | | | |
|---|---|---|---|---|
| 1,276,013 A | * | 8/1918 | Beach | 29/898.01 |
| 1,347,490 A | * | 7/1920 | Beach | 29/267 |
| 2,034,507 A | * | 3/1936 | Colson | 451/28 |
| 2,177,214 A | * | 10/1939 | Heldenbrand | 29/402.11 |
| 2,274,964 A | * | 3/1942 | James | 408/1 R |
| 2,365,940 A | * | 12/1944 | Couse | 296/24.1 |
| 2,672,680 A | * | 3/1954 | Gerner | 29/898.01 |
| 2,682,103 A | * | 6/1954 | Hamilton | 29/275 |
| 2,796,759 A | * | 6/1957 | Baugh et al. | 73/593 |
| 2,811,111 A | * | 10/1957 | Levitz et al. | 296/24.1 |
| 2,928,275 A | * | 3/1960 | Wadsworth | 73/9 |
| 3,007,242 A | * | 11/1961 | Hauer et al. | 29/898.01 |
| 3,047,960 A | * | 8/1962 | Mittenbergs et al. | 33/199 R |
| 3,089,289 A | * | 5/1963 | Serafin | 451/52 |
| 3,139,748 A | * | 7/1964 | Sturm, Jr. | 73/593 |
| 3,183,585 A | * | 5/1965 | West | 29/898.01 |
| 3,308,845 A | * | 3/1967 | Bellas et al. | 296/24.1 |
| 3,393,472 A | * | 7/1968 | Sunnen | 451/155 |
| 3,402,349 A | * | 9/1968 | Parker | 324/215 |

(Continued)

FOREIGN PATENT DOCUMENTS

EP    0039254    11/1981

(Continued)

OTHER PUBLICATIONS

Gale Group Inc., Adams Business Media Motor Service (by Rich Diegle) Sep. 1, 2001, pp. 1-7.*

(Continued)

*Primary Examiner*—Phi D. A
(74) *Attorney, Agent, or Firm*—Polster, Lieder, Woodruff & Lucchesi, L.C.

(57) ABSTRACT

A portable facility, that is delivered to a shop where wheel sets for railcars and locomotives are repaired, contains equipment for reconditioning antifriction bearings that are stripped from the wheel sets. The facility includes an enclosure that contains equipment for inspecting the raceways of the bearings, for repairing the raceways, for opening and closing cages of the bearing to release and again confine its rolling elements, for measuring end play in the bearing, for lubricating the bearing, and for pressing seals into the bearing. In addition, the facility has a deck that supports equipment for disassembling the bearing and for removing grease from it.

23 Claims, 4 Drawing Sheets

U.S. PATENT DOCUMENTS

| | | | | |
|---|---|---|---|---|
| 3,511,079 A | * | 5/1970 | Musser | 73/9 |
| 3,580,059 A | * | 5/1971 | Dalton | 73/672 |
| 3,641,716 A | * | 2/1972 | Price | 51/241 |
| 3,650,004 A | * | 3/1972 | Bergstrom | 29/898.01 |
| 3,697,123 A | * | 10/1972 | Gygrynuk | 296/24.1 |
| 3,769,765 A | | 11/1973 | Wright | |
| 3,810,487 A | * | 5/1974 | Cable et al. | 137/351 |
| 3,844,158 A | * | 10/1974 | Mercer | 72/455 |
| 3,925,679 A | | 12/1975 | Berman et al. | |
| 3,945,152 A | * | 3/1976 | Helgemeir | 51/178 |
| 3,951,284 A | * | 4/1976 | Fell et al. | 414/812 |
| 3,984,158 A | * | 10/1976 | Sorensen et al. | 384/93 |
| 4,015,338 A | * | 4/1977 | Kunze et al. | 33/228 |
| 4,026,136 A | * | 5/1977 | Pell | 72/238 |
| 4,094,546 A | * | 6/1978 | Glassmeyer et al. | 296/28 M |
| 4,173,885 A | * | 11/1979 | Matlock | 73/1.01 |
| 4,230,358 A | * | 10/1980 | Legueu | 296/24.32 |
| 4,232,437 A | * | 11/1980 | Fair | 29/888.011 |
| 4,362,329 A | * | 12/1982 | Laube et al. | 296/26 |
| 4,458,125 A | * | 7/1984 | Leis | 219/659 |
| 4,516,308 A | * | 5/1985 | Urban | 29/564 |
| 4,643,476 A | * | 2/1987 | Montgerard | 296/24 R |
| 4,741,085 A | * | 5/1988 | Bomgardner | 29/402.08 |
| 4,789,047 A | * | 12/1988 | Knobloch | 184/1.5 |
| 4,830,421 A | * | 5/1989 | Hawelka et al. | 296/24.1 |
| 4,958,955 A | * | 9/1990 | Laditka | 404/75 |
| 4,981,318 A | * | 1/1991 | Doane et al. | 296/24.1 |
| 5,017,025 A | * | 5/1991 | Williams | 384/584 |
| 5,033,489 A | * | 7/1991 | Ferre et al. | 134/57 R |
| 5,154,469 A | | 10/1992 | Morrow | |
| 5,165,169 A | * | 11/1992 | Boyce | 29/898.08 |
| 5,226,971 A | * | 7/1993 | Fogal et al. | 134/17 |
| 5,259,676 A | * | 11/1993 | Marti | 384/474 |
| 5,292,090 A | * | 3/1994 | Wetzel et al. | 246/169 R |
| 5,365,013 A | | 11/1994 | Aulson | |
| 5,416,965 A | * | 5/1995 | Mayhugh | 29/402.08 |
| 5,493,817 A | | 2/1996 | Speer | |
| 5,504,996 A | * | 4/1996 | Popovits et al. | 29/898.07 |
| 5,588,752 A | * | 12/1996 | Fetty | 384/477 |
| 5,643,362 A | * | 7/1997 | Garves | 118/264 |
| 5,656,491 A | | 8/1997 | Cassani et al. | |
| 5,706,616 A | * | 1/1998 | Fernandez | 52/143 |
| 5,727,353 A | | 3/1998 | Getz et al. | |
| 5,755,478 A | | 5/1998 | Kamiya et al. | |
| 5,778,795 A | * | 7/1998 | Kusel et al. | 104/3 |
| 5,791,713 A | * | 8/1998 | Dubuc | 296/24.1 |
| 5,833,294 A | * | 11/1998 | Williams et al. | 296/24.32 |
| 5,853,215 A | * | 12/1998 | Lowery | 296/24.1 |
| 5,876,018 A | * | 3/1999 | Crisp et al. | 254/33 |
| 5,893,202 A | * | 4/1999 | Graham et al. | 29/402.02 |
| 6,071,355 A | * | 6/2000 | Suratt | 134/21 |
| 6,158,353 A | * | 12/2000 | Theurer | 104/9 |
| 6,168,676 B1 | * | 1/2001 | Seguin | 148/525 |
| 6,325,435 B1 | * | 12/2001 | Dubuc | 296/24.32 |
| 6,612,008 B1 | * | 9/2003 | Thoma | 29/402.02 |

FOREIGN PATENT DOCUMENTS

| | | | | |
|---|---|---|---|---|
| GB | 1589510 | | 5/1981 | |
| JP | 60081518 | | 5/1985 | |
| JP | 93977 | * | 4/1991 | 52/79.5 |
| JP | 185870 | * | 7/1993 | 296/24.1 |
| JP | 16082 | * | 1/1994 | 296/24.1 |
| JP | 127303 | * | 5/1994 | 296/24.1 |
| RU | 2047516 | | 11/1995 | |
| WO | 9523927 | | 9/1995 | |

OTHER PUBLICATIONS

Gale Group Inc., Advanstar Communication Inc., Motor Age Jun. 1, 2004 pp. 1-2.*

* cited by examiner

PORTABLE FACILITY AND PROCESS FOR RECONDITIONING ANTIFRICTION BEARINGS

BACKGROUND OF THE INVENTION

This invention relates in general to antifriction bearings and, more particularly, to reconditioning such bearings.

Railcar wheels wear along their treads and flanges and periodically are removed from service and reconditioned or replaced, depending on the extent of the wear. When a wheel set is removed from its truck, the bearings for the wheel set are typically stripped from the journals to which they are fitted and replaced with new or reconditioned bearings, most likely the latter. The bearings that are removed are then reconditioned and installed on the journals of another wheel set.

Reconditioning bearings requires equipment and skills not ordinarily found in the typical shop for reconditioning wheels. The wheel shop ordinarily sends the bearings to a bearing manufacturer which operates a reconditioning facility—and that facility may exist at a location far removed from the wheel shop, perhaps even in a different country.

This arrangement creates problems and inefficiencies. For one, transporting bearings and keeping track of them is expensive. Moreover, each wheel shop must maintain a large inventory of bearings and perhaps bearing parts. Also, bearing reconditioning facilities often operate where the cost of labor is high and cannot take advantage of low-cost labor elsewhere. Some countries prohibit the export of government-owned equipment for any purpose, including reconditioning, so where restrictions of this type exist, a bearing that is removed from a wheel set for a car or locomotive of a government operated railway cannot be sent to a foreign country for reconditioning.

SUMMARY OF THE INVENTION

The present invention resides in a portable facility for reconditioning antifriction bearings. The facility includes an enclosure containing equipment for inspecting and repairing the bearings. The invention also resides in the process of delivering a portable facility to a shop that repairs wheel sets for rail cars and locomotives, with the facility containing equipment for inspecting and repairing antifriction bearings that are stripped from the wheel sets.

DETAILED DESCRIPTION OF INVENTION

Figure 1:
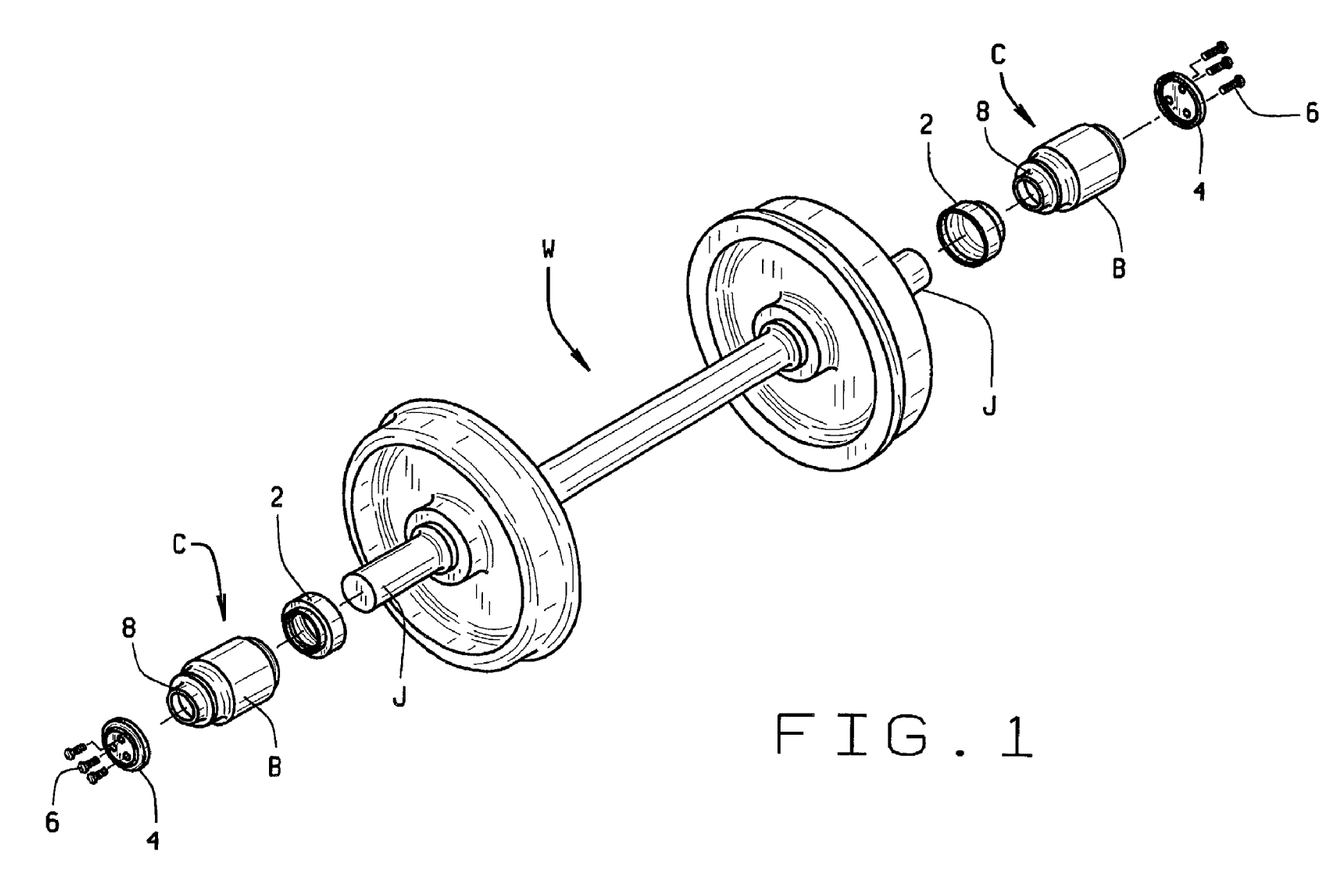
FIG. 1 is a perspective view of a wheel set for a railcar or locomotive, with the bearings that are to be reconditioned and related components detached from it.

Referring now to the drawings, (FIGS. 3 and 4), a portable facility A contains equipment for reconditioning a bearing B (FIG. 2)—actually multiple bearings B—of the type used in railcar and locomotive trucks. The facility A is small enough and light enough to be transported on a railcar or a ship or even on a trailer towed by an over-the-road tractor. While the portable facility A could be set up and placed into operation almost anywhere, one would most likely find it at a shop where railcar and locomotive wheels are reconditioned. These wheels along with axles form wheel sets W (FIG. 1) The bearings B fit over the axles of the wheel sets W—actually, over journals J at the ends of the axles. At the shop the wheel sets W are removed from their trucks, and the bearings B are stripped from the journals J. Actually, each bearing B forms part of a larger bearing assembly C, and the entire assembly C is removed from the axle journal J at the shop, and delivered to the facility A.

In addition to the bearing B, the bearing assembly C includes (FIGS. 1 and 2) a backing ring 2 which is located at the inboard end of the bearing B and an end cap 4 located beyond the outboard end of the bearing B. The backing ring 2, like the bearing B itself, fits around journal J, but in contrast to the bearing B bears against a fillet at the inboard end of the journal J. The end cap 4, on the other hand, fits over the end of the journal J where it is secured with several cap screws 6 that thread into the journal J. Clamped between the backing ring 2 and the bearing B is an inboard wear ring 8 and between the end cap 4 and the bearing B is an outboard wear ring 8. Completing the additional components are seals 10 which fit into the bearing B and establish dynamic fluid barriers around the wear rings 8.

Turning now to the bearing B (FIG. 2), it includes (FIG. 2) an outer race in the form of a double cup 20, an inner race in the form of two cones 22 located within the cup 20, and rolling elements in the form of tapered rollers 24 arranged in two rows, there being a separate row around each cone 22. In addition, the bearing B has two cages 26, one around each cone 22. Each cage 26 maintains the proper spacing between the rollers 24 of its cone 22 and further retains the rollers 24 around that cone 22 when the cone 22 is removed from the cup 20. Indeed, each cone 22, its compliment of rollers 24 and its cage 26 forms a component known as a cone assembly 28. Finally, the bearing B includes a spacer 30 which fits between the two cones 22 and establishes the spacing between them. The two cones 22 fit over the journal J with interference fits, and are clamped together between the backing ring 2 and the end cap 4 with the spacer 30 separating them. The spacer 30 thus controls the setting of the bearing B, and that should be one of slight end play, perhaps 0.001 to 0.015 inches, when the bearing B is fitted to the journal J.

Figure 2:
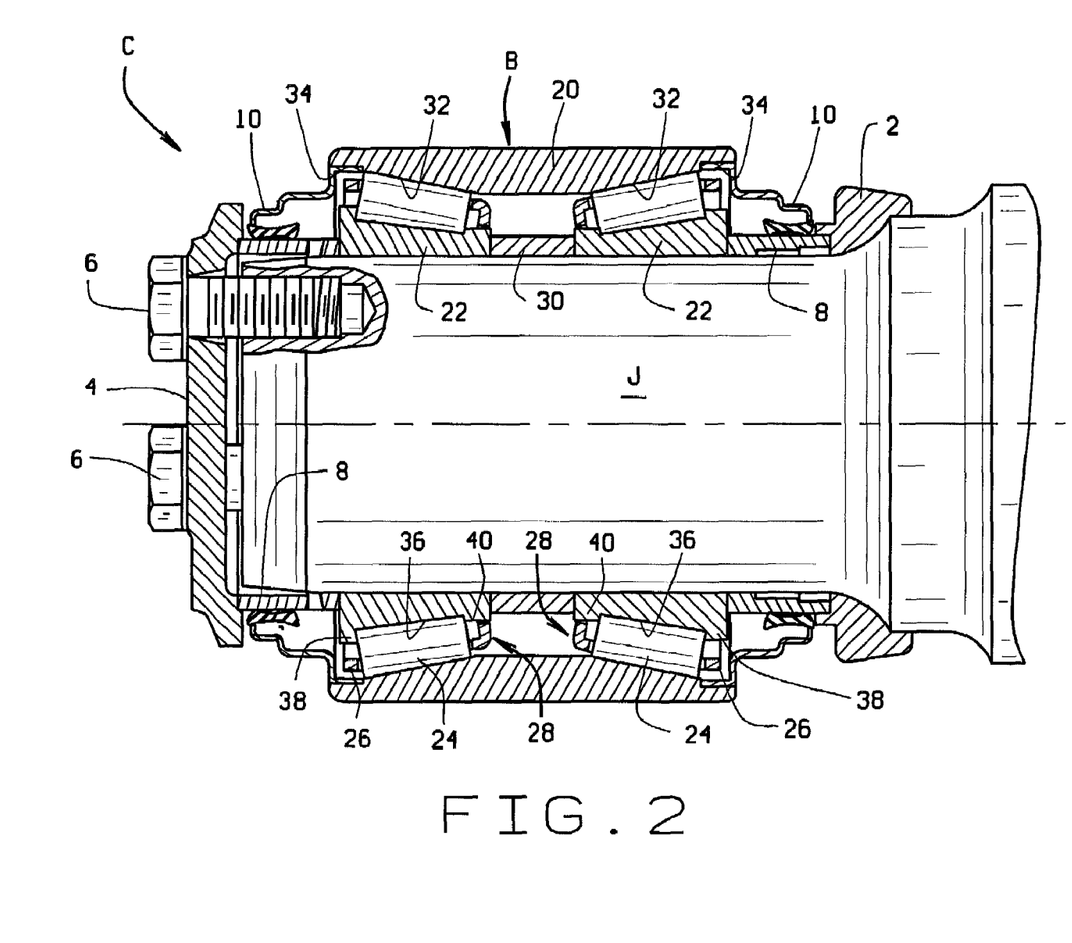
FIG. 2 is a longitudinal sectional view of a typical bearing that is reconditioned at the portable facility of the present invention and in accordance with the process of the present invention.

The cup 20 has tapered raceways 32 which are presented inwardly toward the two cones 22, there being a separate cone 22 within each raceway 32. The raceways 32 lead out to counterbores 34 which, in turn, open out of the ends of the cup 20. The seals 10 fit into the counterbores 34 with interference fits. Each cone 22 has a tapered raceway 36 that is presented outwardly toward that cup raceway 32 that surrounds the cone 22. In addition, each cone 22 has a thrust rib 38 at the large end of its raceway 36 and a retaining rib 40 at the small end. The cones 22 at the ends of their retaining ribs 40 abut the spacer 30.

The tapered rollers 24 along their tapered side faces contact the raceways 32 and 36 of the cup 20 and cones 22, respectively, while the large ends of the rollers 24 bear against the thrust ribs 38. Indeed, the thrust ribs 38 prevent the rollers 24 from moving up the raceways 32 and 36 and out of the bearing B. Around each cone 22 the two ribs 38 and 40 confine the rollers 24 axially, whereas the raceway 36 and cage 26 confine the rollers 24 radially. The rollers 24, in turn, keep the cage 26 in place. Hence, each cone assembly 28 remains intact when removed from the cup 20.

During the operation of the bearing B, the cones 22 and spacer 30 revolve within the cup 20, and the rollers 24 roll along the raceways 32 and 36 on the cup 20 and cones 22, respectively, reducing friction to a minimum. As the rollers 24 roll along the raceways 32 and 36 they pass through a load zone where the load is transferred from the cup 20, through the rollers 24 of the two rows, to the cones 22, and thence to the journal J. The cyclic stresses produced by the rollers 24 as they pass through the load zone fatigue the hardened steel at the raceways 32 and 36, and this may cause spalling. Sometimes water migrates along the wear ring 8 and seeps past the seals 10. It can leave water etching—basically rust—on the raceways 32 and 36. When the bearing B experiences severe impacts, as when its railcar leaves the rails and the wheels bump over the ties to which the rails are secured, the raceways 32 and 36 may exhibit "brinelling", which is actually the presence of slight indentations in the raceways 32 and 36 as a consequence of the rollers 24 being driven with immense force against them.

Thus, when the bearing B is stripped from the journal J on the axle of the wheel set W, the raceways 32 and 36 of its cup 20 and cones 22 should be inspected to insure that they do not exhibit spalling or water etching or excessive brinelling. Likewise, the rollers 24 should be inspected for deterioration. The seals 10 require replacing, as may other components, such as the wear rings 8. The facility A enables all of this to be performed at the shop at which the repairs to the wheel sets W are made, or for that matter, practically anywhere else.

The facility A includes (FIGS. 3 and 4) an enclosure 50 which is small enough and light enough to be moved on a transport vehicle, such as a railcar or perhaps even on a large truck. It has a receiving end to which used bearings B are delivered and a discharge end from which reconditioned bearings B are released. Moreover, enclosure 50 has a floor 52, a roof 54, and side walls 56 and 58 extending between the floor 52 and roof 54 to support the roof 54 above the floor 52. At the receiving end the side walls 56 and 58 support doors 60 which are attached to them with hinges, so that they can swing between open and closed positions. At the discharge end the side walls 56 and 58 support more doors 62 which are supported on more hinges to enable them to swing between open and closed positions. When the doors 60 and 62 are closed, they isolate the interior of the enclosure 50 from the surrounding environment and to a large measure exclude contaminants, such as water and dust, from the interior. Moreover, the doors 60 and 62, when closed, prevent unauthorized individuals from entering the interior of the enclosure 50 and disturbing the equipment and bearings B within it. A conventional 40-foot shipping container with a few modifications serves well as the enclosure 50.

Figure 3:
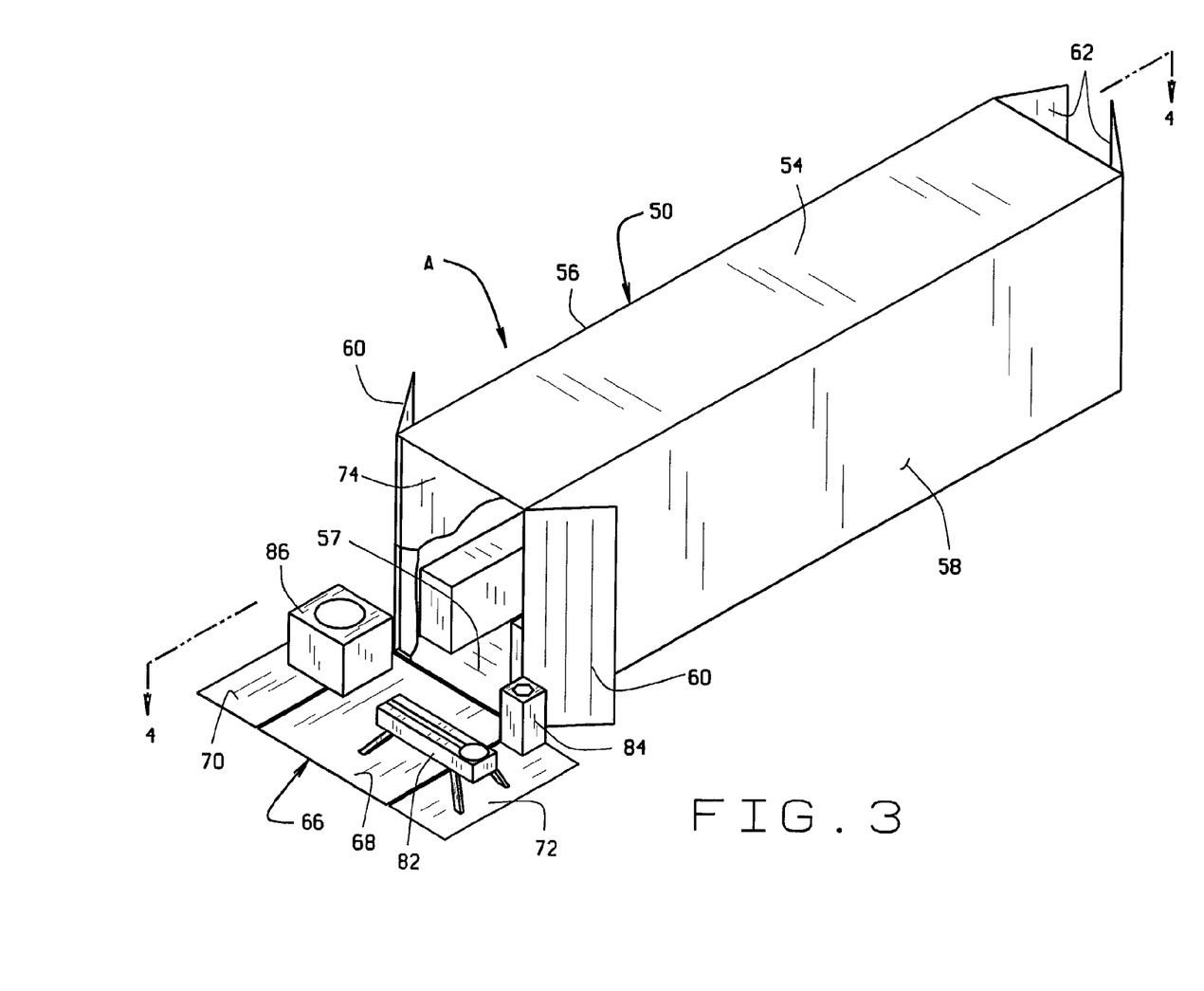
FIG. 3 is a perspective view of the portable facility for reconditioning bearings.
Figure 4:
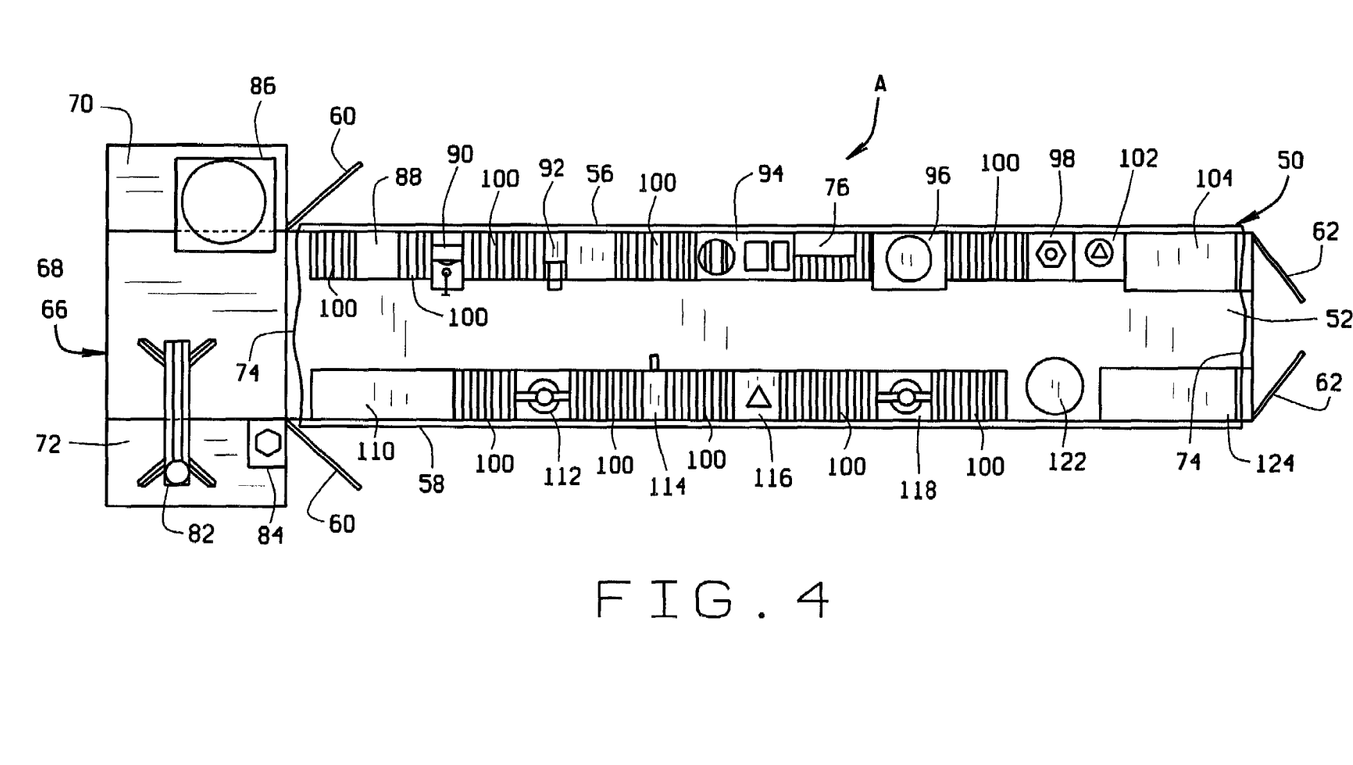
FIG. 4 is a sectional view of the portable facility taken along line 4-4 of FIG. 3.

The modifications include a deck 66 at the receiving end of the enclosure 50 where it folds between storage and open positions. When in the storage position, the deck 66 lies folded inwardly on itself and against the closed doors 60. When in the open position, the deck 66 projects longitudinally beyond the floor 52 as well as laterally beyond the side walls 56 and 58. To this end, the deck 66 includes a center panel 68 which is attached to the floor 52 with hinges such that it can swing between vertical and horizontal positions. It also includes side panels 70 and 72 which are attached with hinges to the sides of the center panel 68 such that they can fold over onto the center panel 68 and, of course, outwardly from it. When the deck 66 is in its storage position, the side panels 70 and 72 are folded against the center panel 68 and the center panel 68 is folded upwardly behind the closed doors 60, with the side panels 70 and 72 being between the doors 60 and the center panel 68. When the deck 66 is in its open position, the center panel 68 is folded downwardly and extends horizontally from the floor 52 as a continuation of the floor 52. The side panels 70 and 72, on the other hand, extend outwardly from the center panel 68 to form lateral extensions of it. The enclosure 50, of course, rests on a supporting surface, which may be the floor of a warehouse or factory or even the surface of a parking lot, and when the deck 66 is in its open position, its center panel 68 and side panels 70 and 72 rest on the same supporting surface.

The enclosure 50 also has curtains 74 (FIG. 3) which are attached to the roof 54 at the receiving and discharge ends and drape downwardly over the open receiving end when the doors 60 are open and over the open discharge end when the doors 62 are open, all to maintain a conditioned environment within the enclosure 50. In this regard, the enclosure 50 is equipped with an air-conditioning unit 76 which is supported on its side wall 56. It also includes a dust extracting system with ducting that extends to locations where dust may be generated Moreover, the enclosure 50 has electrical circuitry to which the air conditioning unit 76 as well as other equipment of the facility A is connected, and this circuitry may be connected to an outside source of electrical power or to a motor-generator unit carried by the enclosure 50 or in an auxiliary container that may be stored in the enclosure 50 when not in use.

The facility A includes a variety of conventional equipment for reconditioning bearings B, and much of this equipment requires electrical energy and is thus connected to the electrical circuitry of the enclosure 50. Moreover, most of the equipment is anchored to the floor 52 and side walls 56 and 58 of the enclosure 50, leaving a center aisle 78 for the workmen responsible for reconditioning bearings B.

However, some of the equipment is stored in the center aisle 78 when the deck 66 is raised to its storage position as when the facility A is in transit. However, when the deck 66 is lowered and folded to its open position to place the facility A in operation, this stored equipment is moved from the aisle 78 to the deck 66 where it is supported on the open panels 68, 70 and 72. For the most part, the stored equipment generates dirt and other contaminants and should be segregated from the equipment that is in the enclosure 50, since the equipment in the enclosure 50 is utilized to inspect and repair the bearings B. It must therefore operate in a clean environment. The curtains 74 at the receiving and discharge ends serve to minimize the ingress of contaminants into the interior of the enclosure 50, when the doors 60 and 62 are open, while the dust extracting system removes dust generated by equipment within the enclosure 50.

Among the stored equipment that is placed on the deck 66 is a break down bench 82 (FIGS. 3 and 4). Here a workman pulls the seals 10 from the counterbores 34 at the ends of the cup 20 and discards them. This frees the two cone assemblies 28, which the workman removes from the cup 20 along with the spacer 30. The stored equipment also includes a flinger 84 into which the workman places each cone assembly 28. The flinger 84 firmly holds the cone 22 of the cone assembly 28 and rotates the cage 26 along with the tapered rollers 24 confined by it at a velocity great enough to dislodge most of the grease trapped in it. Indeed, the centrifugal force generated flings the grease outwardly away from the rollers 24 and cage 26.

Also used on the deck 66 as part of the stored equipment is a washer 86. After removing the cone assemblies 28 from the flinger 84, the workman places them in the washer 86, along with the cup 20 and spacers 30. Here an alkaline solution— basically water and detergent—removes any grease that remains on the cone assemblies 28 and also the grease that is on the cup 20 and spacer 30. The backing ring 2, end cap 4 and seal wear. rings 8 also go into the washer 86. The workman then brings the cone assemblies 28, the cup 20 and the spacer 30 into the interior of the enclosure 50 where further procedures ensue.

Along the side wall 56 of the enclosure 50, the facility A has (FIG. 4) a brushing station 88, a buffing station 90, a cone inspection station 92, a cup inspection and repair station 94, a lateral measuring station 96, and a lubrication station 98 arranged in that order from the receiving end where the doors 60 are located, with each being preceded by a transfer surface 100, such as a bench top or roller conveyor. Beyond the lubrication station 98 is a seal installation station 102 and finally a packaging station 104. Along the other side wall 58, again beginning at the receiving end where the doors 60 are located, is an inspection station 110 for the backing ring 2 and end cap 4, a cage opening station 112, a cone repairing station 114, a roller sizing station 116, and a cage closing station 118, each followed by a transfer surface 100.

The space along the wall 58 between the last transfer surface 100 and the doors 62 at the discharge end is occupied by grease pump 122 and a storage area 124. The compressor for the air conditioning unit 76 may occupy a portion of the storage area 124.

The center aisle 78 extends the full length of the enclosure 50 and separates the stations 88, 90, 92, 94 96, 98, 102 and 104 that are along the wall 56 from the stations 110, 112, 114, 116, and 118 that are along the other side wall 58. The aisle 78 also separates the packaging station 104 from the storage area 124. Workmen work within the aisle 78 at the several stations that are along it.

After a cone assembly 28 is removed from the washer 86, it is dried and placed on the transfer surface 100 leading to the buffing station 90. Here a workman places it in a machine that spins the rollers 24 and buffs them with a mild abrasive. This removes water stains, that is to say rust, from the rollers 24. The cone assembly 28 goes on to the next transfer surface 100 where it awaits the cone inspection station 92.

At the cone inspection station 92 a workman places the cone assembly 28 in a fixture which shines light into the cone 22 at the small ends of the rollers 24 around it such that the light passes between the cage 26 that confines the rollers 24 and the raceway 36 of the cone 22. While the cone 22 rotates slowly, the workman looks at the cone raceway 36 from the large ends of the rollers 24, that is over the thrust rib 38. By this visual observation as well as by touch and by a probe, the workman determines if the raceway 36 exhibits damage, such as spalling or water etching or brinelling. The workman also inspects the rollers 24 for damage.

Finally, the workman, using a cone bore gauge at the station 92, measures the diameter of the bore that extends through the cone 22. If the raceway 36 of the cone 22 and the rollers 24 around it exhibit no damage, the workman transfers the cone assembly 28, of which they are a part, to transfer surface 100 preceding the lateral measuring station 96. Here the cone assembly 28 awaits other components, that is, the remaining cone assembly 28, the cup 20, and the spacer 30, anyone of which may be reconditioned or new.

On the other hand, if any of the rollers 24 or the raceway 36 of a cone 22 forming part of a cone assembly 28 that undergoes inspection at the inspection station 92 displays damage, the cone assembly 28 is delivered across the aisle 78 to the transfer surface 100 that leads to the cage opening station 112. Here a workman places the cone assembly 28 in a press which plastically deforms the cage 26 to the extent that the rollers 24 are released from it. The workman saves the cone 22 and the rollers 24, but discards the cage 26. The cone 22 goes on to the transfer surface 100 that leads to the cone repairing station 114, whereas the set of rollers 24 goes to the transfer surface 100 leading to the roller sizing station 116.

At the cone repairing station 114, a workman examines the raceway 36 of the cone 22 to determine if the raceway 36 can be restored. If the cone 22 contains too much spalling or excessive brinell markings, the cone 22 is discarded. In the case of minor spalling, the workman removes the spalling with a hand-held grinder. The workman will also remove water etchings with a polishing tool. The cone 22, when so reconditioned, is joined with the rollers 24 on the transfer surface 100 that leads to the roller sizing station 116.

At the roller sizing station 116, a workman examines the rollers 24 of the set and removes any that are damaged. For each roller 24 that is removed, the workman substitutes a compatible roller 24, that is one of equivalent taper and length and of a diameter that is equivalent in the sense that it falls within acceptable tolerances.

The repaired cone 22 and the complement of rollers 24, with each roller 24 being in serviceable condition, passes over the transfer surface 100 leading to the cage closing station 118. At the station 118 the rollers 24 are placed around the raceway 36 for the cone 22 and a new cage 26, configured to fit over the cone 22 and rollers 24 without interference, is placed over them. Once the rollers 24 and cage 26 are in place, a press at the closing station 118 closes the cage 26, in effect plastically deforming it to its operable configuration. This completes the reconditioning of the cone assembly 28. The reconditioned cone assembly 28 is transferred across the aisle 78 to the transfer surface 100 that leads to the lateral measuring station 96. Here it joins the other cone assembly 28 for the bearing B that is being reconditioned.

The cup 20 for the bearing B, in the meantime, goes from the washer 86 to the transfer surface 100 preceding brushing station 88. A workman at the station 88, using a power brush, cleans the cylindrical outside surface of the cup 20 to remove rust and foreign substances adhering to it. The cup 20 is then placed on the transfer surface 100 preceding the cup inspection and repair station 94. At the station 94 a workman examines the cup 20, particularly its raceways 32, to determine if either raceway 32 exhibits excessive spalling or brinelling or bears water etching. Being rust, water etching is usually removed simply with a polishing tool. Some spalling can be removed with a hand-held grinding tool, but excessive spalling or overly deep brinell marks require replacement of the cup 20. With gauges the workman at the station 90 also measures the outside diameter of the cup 20 and the diameters of the counterbores 34.

Assuming that the cup 20 is capable of being repaired and indeed is repaired at the cup inspection and repair station 94, it joins the two cone assemblies 28 on the transfer surface 100 leading to the lateral measuring station 96. On the other hand, if the cup 20 cannot be restored, a new or a reconditioned cup 20 is substituted for it.

A machine at the lateral measuring station 96 has the capacity to rotate the cones 22 within the cup 20 of the bearing B and during the rotation measure the axial free motion or end play within the bearing B. It will be recalled that the bearing B operates with internal clearances, both radial and axial. As a consequence, the two cones 22 together with the spacer 30 can shift axially within the cup 20. The magnitude of the displacement is called end play. A workman places the bearing B in the machine at the lateral measuring station 96, whereupon the machine rotates the cones 22 relative to the cup 20, and as it does, it applies an axially directed force that seats the rollers 24 of one row against the raceways 32 and 36 for that row. Then it applies an axially directed force in the opposite direction to seat the rollers 24 of the other row against its raceways 32 and 36. Owing to the internal clearances in the bearing B, the cones 22 undergo an axial displacement between the application of the two forces, and that displacement is the end play—more accurately bench end play, inasmuch as it is measured off the axle journal J. If the bench end play does not fall within tolerances, the workman substitutes spacers 30 of differing length until it does.

While the cone assemblies 28 and cup 20 undergo inspection and repair, the backing ring 2, end cap 4 and seal wear rings 8 are removed from the washer 86 and dried, whereupon they are delivered to the inspection station 110. Here they are examined for damage, and if acceptable, are passed on to the seal installation station 102 and packing station 104. Moreover, the seal wear rings 8, either used if in acceptable condition or otherwise new, are fitted into the seals 10 where they are gripped by the elastomeric seal elements of the seals 10.

A workman at the seal installation station 102 presses the backing ring 2 over one of the wear rings 8.

After the correct spacer 30 is selected at the lateral measuring station 96, the cup 20, cone assembles 28 and spacer 30 move over the transfer surface 100 that leads to the lubrication station 98. Here one of the cone assemblies 28 is packed with grease which is supplied under pressure by the grease pump 122. The workman then transfers the greased cone assembly 28 to the seal installation station 102 where it joins the cup 20. The workman installs the greased cone assembly 28 in one end of the cup 20, and then using a press at the seal installation station 102, presses a seal 10 into the counterbore 34 behind the cone assembly 28. The other cone assembly 28 is then packed with grease at the lubrication station 98 and transferred to the seal installation station 102 where it is inserted into the opposite end of the cup 20 along with the proper spacer 30. Another seal 10 is pressed into the counterbore 34 behind the second cone assembly 28. The seals 10 capture the cone assemblies 28 and the spacer 30 in the cup 20 and in that sense unitize the bearing B and further retain the wear rings 8.

The bearing B is then transferred to the packaging station 104 where it is placed in a box or on a pallet. The end cap 4 and cap screws 6 are also placed in the box.

The box containing the unitized bearing B, backing ring 2 and cap screws 6 is then moved to the storage area 124 for subsequent installation on journals J of wheel sets W undergoing repair. The storage area 124 also holds spare cups 20, cone assemblies 28, and rollers 24 to replace damaged ones, as well as a supply of spacers 30 of varying length to provide the reconditioned bearings B with the proper settings. In addition, it has a supply of new cages 26, wear rings 8, and seals 10.

The facility A, with a modification of its equipment, may be used to recondition other types of bearings, such as angular contact ball bearings, spherical roller bearings, or cylindrical roller bearings. Also, the enclosure 50 may be attached permanently to a railcar, and when in use, its deck 66 may be supported on posts.

PORTABLE FACILITY AND PROCESS FOR RECONDITIONDNG ANTIFRICTION BEARINGS

A portable facility
B bearing B
C bearing assembly
W wheel set
J journal
2 backing ring
4 end cap
6 cap screws
8 wear rings
10 seals
20 cup
22 cones
24 tapered rollers
26 cage
28 cone assembly
30 pacer
32 raceways (cup)
34 counterbore
36 raceway (cone)
38 thrust rib
40 retaining rib
50 enclosure
52 floor
54 roof
56 side wall
58 side wall
60 doors
62 doors
66 deck
68 center panel
70 side panel
72 side panel
74 curtain
76 air conditioning unit
78 center aisle
82 break down bench
84 finger
86 washer
88 brushing station
90 buffing station
92 cone inspection station
94 inspection cup and repair station
96 lateral measuring station
98 lubrication station
100 transfer surface
102 seal installation station
104 packaging station
110 inspection station
112 cage opening station
114 cone repairing station
116 roller sizing station
118 cage closing station
122 grease pump
124 storage area

What is claimed is:

1. A portable facility for reconditioning an antifriction bearing having components including a race provided with a raceway and rolling elements that roll along the raceway, said facility comprising: an enclosure that is portable in the sense that it can be moved by a transport vehicle; means within the enclosure for inspecting components of the bearing; more means within the enclosure for repairing defects in components of the bearing; and spare races and rolling elements located within the enclosure to replace damaged races and rolling elements.

2. A portable facility according to claim 1 and further comprising means within the enclosure for lubricating the bearing.

3. A portable facility according to claim 2 and further comprising means for cleaning the bearing.

4. A portable facility according to claim 3 wherein the means for cleaning the bearing is located outside the enclosure.

5. A portable facility according to claim 4 wherein the enclosure has at least one end through which access to the interior of the enclosure is obtained, and further comprising a deck at said one end of the enclosure, the means for cleaning the bearing being on the deck.

6. A portable facility according to claim 2 wherein the enclosure contains stations at which the means for inspecting, repairing defects, and lubricating the bearings are located; wherein the enclosure has side walls and the stations are located along the side walls; and wherein a center aisle separates the stations along each side wall.

7. A portable facility according to claim 1 wherein the enclosure has side walls, ends through which access to the interior of the enclosure is obtained, a roof which extends between the side walls and over the interior of the enclosure, and doors attached to the side walls for closing the ends of the enclosure.

8. A portable facility for reconditioning a tapered roller bearing including a cup having a tapered raceway that is presented inwardly, a cone having a tapered raceway that is presented outwardly toward the raceway of the cup, tapered rollers located in a row between the raceways of the cup and cone, and a cage fitted to the rollers to maintain the correct spacing between the rollers and to retain the rollers around the cone in the absence of the cup, thus uniting the cone, rollers and cage into a cone assembly, said facility comprising: an enclosure containing a plurality of stations and being portable in the sense that it can be moved by a transport vehicle; means at one of the stations for inspecting the cone assembly; means at another of the stations for inspecting and repairing the raceway of the cup; means at still another station for opening the cage and releasing the rollers; means at yet another station for repairing the raceway of the cone; a spare cage in the enclosure for replacing an opened cage; and means at another station for closing a new cage about the rollers on the cone to retain the rollers on the cone and unite the cone assembly formed by cone, rollers, and new cage.

9. A portable facility according to claim 8 and further comprising means in the enclosure at another station for lubricating the cone assembly, means at still another station for installing a seal into the cup, with the seal being configured to retain the cone assembly in the cup; and spare seals in the enclosure.

10. A portable facility according to claim 8 for reconditioning a bearing having two raceways in its cup, two cone assemblies, and a spacer between the cones, with the spacer being long enough to impart end play to the bearing; and further comprising means at yet another station for measuring the end play in the bearing.

11. A portable facility according to claim 8 wherein the enclosure has side walls; wherein the stations are located along the side walls; and wherein the enclosure contains an aisle that is located between the stations along each side wall.

12. A portable facility according to claim 8 and further comprising a deck adjacent to the enclosure and means on the deck for removing grease from the bearing.

13. A portable facility according to claim 1 wherein the bearing which is reconditioned at the facility has a cage within which the rolling elements are located, with the cage serving to maintain the proper spacing between the rolling elements and further holding the rollers around the raceway of the race when the race is removed from an opposing raceway; and wherein the enclosure contains means for opening the cage to release the rolling elements from the race and means for closing a cage around rolling elements to retain the rolling elements on the race.

14. A portable facility for reconditioning an antifriction bearing that was used on the journal of an axle for a railcar or locomotive and includes inner and outer races provided with opposed raceways, and rolling elements located between the races and along the raceways, said facility comprising:
  an enclosure that is portable in the sense that it can be moved by a transport vehicle;
  a washer containing a solution for removing grease from the races and rolling elements;
  equipment within the enclosure for inspecting the races;
  equipment within the enclosure for repairing the bearing; and
  spare inner and outer races and rolling elements located within the enclosure to replace a damaged race or rolling element.

15. A portable facility according to claim 14 wherein the bearing has seals to establish fluid barriers at its ends, and the facility further comprises spare seals located within the enclosure for replacing the seals of the bearing.

16. A portable facility according to claim 14 wherein the equipment for inspecting the races includes a fixture which shines a light on the inner race to enable a workman to observe the raceway of the inner race.

17. A portable facility according to claim 14 wherein the equipment for inspecting the bearing includes a gauge that measures the diameter of a bore that extends through the inner race.

18. A portable facility according to claim 14 wherein the outer race is unitary and has two raceways which are inclined downwardly toward each other; wherein the inner race is on two separate components, each having a raceway that is presented toward a raceway of the outer race and is inclined in the same direction as the raceway toward which it is presented; wherein the rolling elements are arranged in two rows, there being a separate row around each raceway of the inner race; wherein the bearing further includes a cage located around each component of the inner race for maintaining the proper spacing between the rolling elements and for holding the rolling elements around the component in the absence of the outer race; and wherein the facility further includes within the enclosure new cages to replace the cage of either component of the inner race; and wherein the equipment for repairing the bearing includes a press which will plastically deform the cage around either component of the inner race to free the rolling elements from that race and a press for plastically deforming a replacement cage around the component of the inner race to capture rolling elements about that component.

19. A portable facility according to claim 18 wherein the bearing further includes a spacer located between the components of the inner race and being long enough to impart the end play to the bearing; and wherein the facility further comprises a lateral measuring machine which rotates the inner race within the outer race, applies axially directed forces to the inner race in both axial directions, and measures the free motion between the inner and outer races resulting from the two directions of force.

20. A portable facility according to claim 14 wherein the equipment for repairing the bearing includes a hand-held grinder.

21. A portable facility according to claim 14 and further comprising a polishing tool.

22. A portable facility according to claim 21 and further comprising an air-conditioning unit supported on the enclosure and including a dust extraction system.

23. A portable facility according to claim 14 wherein the enclosure is mounted on a railcar.

* * * * *